No. 749,708. PATENTED JAN. 12, 1904.
G. WESTINGHOUSE.
FRICTION SPRING MECHANISM.
APPLICATION FILED MAY 22, 1903.
NO MODEL. 2 SHEETS—SHEET 1.

WITNESSES
J. S. Custer
Jas. B. MacDonald

INVENTOR
George Westinghouse
By E. Wright
Att'y.

No. 749,708. PATENTED JAN. 12, 1904.
G. WESTINGHOUSE.
FRICTION SPRING MECHANISM.
APPLICATION FILED MAY 22, 1903.
NO MODEL. 2 SHEETS—SHEET 2.
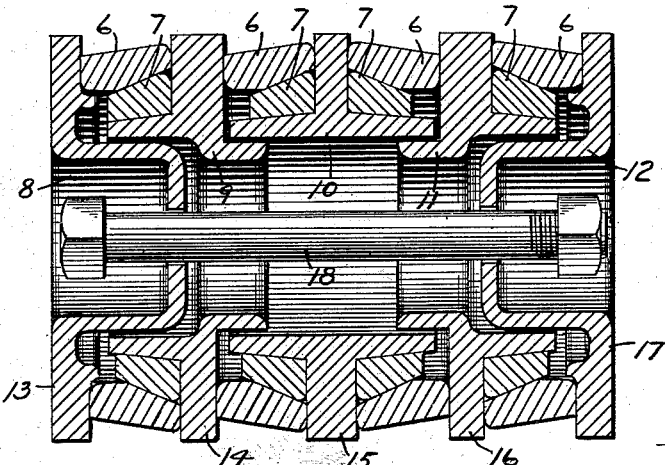
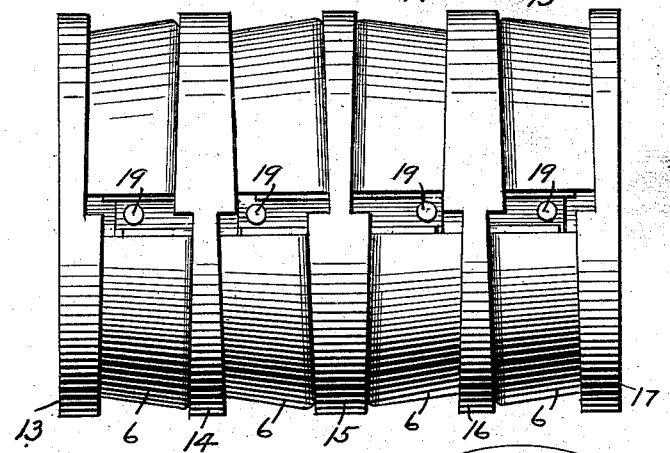
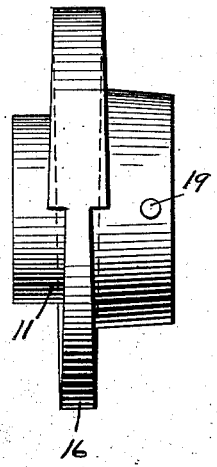
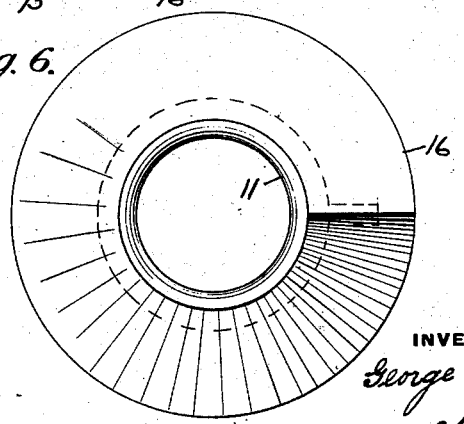
WITNESSES
J. S. Custer
Jas. B. MacDonald.
INVENTOR
George Westinghouse
By E. Wright
Att'y.

No. 749,708. Patented January 12, 1904.

UNITED STATES PATENT OFFICE.

GEORGE WESTINGHOUSE, OF PITTSBURG, PENNSYLVANIA.

FRICTION SPRING MECHANISM.

SPECIFICATION forming part of Letters Patent No. 749,708, dated January 12, 1904.

Application filed May 22, 1903. Serial No. 158,341. (No model.)

*To all whom it may concern:*

Be it known that I, GEORGE WESTINGHOUSE, a citizen of the United States, residing in Pittsburg, county of Allegheny, State of Pennsylvania, have invented a certain new and useful Improvement in Friction Spring Mechanism, of which improvement the following is a specification.

My invention relates in general to friction devices for yieldingly resisting strains and gradually absorbing shocks, and more particularly to that class of these appliances used as draw-gear and buffing apparatus or spring dampening devices for railway-cars. Heretofore apparatus for this purpose has been proposed comprising a combination of resilient elements or springs and friction elements for gradually transmitting to the draft-timbers of a car the varying stresses exerted at the draw-bar. It has also been proposed to provide the resilient or spring elements with engaging friction-surfaces, thereby dispensing with additional friction members. In this latter construction the resilient members or spring friction-rings have heretofore been made helical in form, having a certain camber or pitch, so that when such engaging friction-rings are subjected to compression between relatively movable parts the rings flatten out and change from a helical form to that of a circle, the rings by their resiliency reassuming their helical form as the pressure is removed. This construction, comprising the helical spring friction-rings provided with inclined frictional faces, is expensive and difficult to manufacture with accuracy; and the principal object of my invention is to provide means whereby resilient friction elements of a circular form may be employed and coöperate with relatively movable parts having properly-formed helical or other than plane surfaces for engaging the friction-rings, whereby the rings will be caused to assume a helical form when subjected to compression, thus simplifying the construction and reducing the cost of manufacture, while at the same time producing an equally efficient and durable device.

Figure 1:
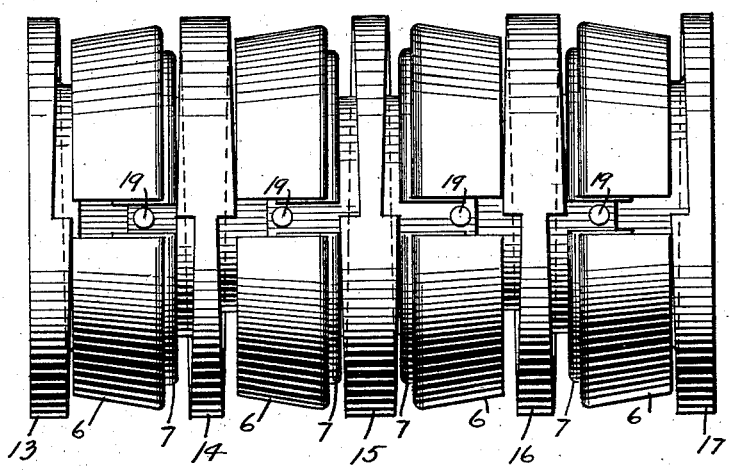
Figure 2:
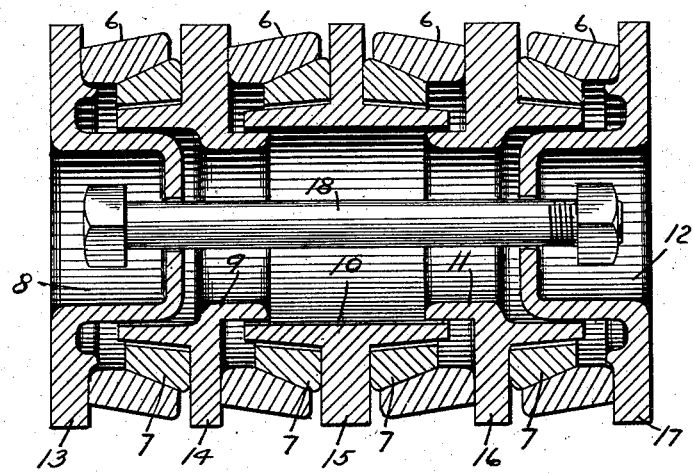

In the accompanying drawings, Figure 1 is a plan view of my invention, the rings being shown in the normal position when not subjected to compression; Fig. 2, a central sectional view, the rings being shown in the positions which they assume when subjected to a sufficient amount of compression to force the same into a helical form in engagement with the helical surfaces of the flanges of the sections; Fig. 3, a central sectional view showing the position of the rings when subjected to maximum compression; Fig. 4, a corresponding plan view; Fig. 5, an edge view of one of the sections of the supporting-core; and Fig. 6, an end view of the same, showing the helical surface for engaging the side face or edge of one of the rings.

According to the construction shown in the drawings the friction spring mechanism is composed of a series of pairs of resilient elements or rings, each pair comprising an expansible spring-ring 6 and a compressible spring-ring 7, the latter being nested within the former and having an inclined or conical frictional face engaging a corresponding frictional face on the outer expansible ring. The rings are preferably made in a circular form and cut or split at one point, as shown, to allow for radial expansion and contraction. In order to support the rings in position and cause a bending of the same to a helical form when subjected to compression, a core is provided formed in sections or members 8, 9, 10, 11, and 12 and having radially-projecting flanges 13, 14, 15, 16, and 17, respectively. A pair of the spring friction-rings is supported on the core between the flanges of adjacent sections, which flanges are provided with helical or other than plane surfaces arranged to engage the edges of the spring-rings and to bend the same to the form of a helix when the parts are subjected to longitudinal or axial compression. The two end sections 8 and 12 may, if desired, also constitute followers for the mechanism, and all these sections or relatively movable members may have telescopic cylindrical flanges for supporting the sections and the friction-rings thereon. The bolt 18 serves to prevent the two end sections or follower-plates from moving too far apart and also serves to hold all the parts together in normal position. Radially-projecting pins 19 may be located in the cylindrical portions of the movable sections of the core and extend into the space between the cut ends of the spring-rings for the purpose of holding the said ends opposite the respective high and low points of the corresponding helical surfaces and preventing any rotary movement of the rings upon the core.

The operation of this form of my improvement is as follows: When applied as a draft and buffing mechanism for cars and one of the followers is moved toward the other, one end of each expansible ring 6 and the opposite end of the corresponding compressible ring 7 of each pair engages with the respective high points of the helical surfaces of the flanges of the adjacent movable members or sections of the core, and as these sections are further moved toward each other the rings are caused to bend and assume a helical form, this movement being resisted by the spring resistance of the rings. Further movement of the sections causes the inclined frictional faces of the rings of each pair to slide upon each other, the inner or compressible ring being forced into its outer or expansible ring with a wedge-like action, producing an expansion of the outer ring and a compression of the inner ring. This movement is therefore opposed by the frictional resistance exerted between the inclined engaging faces of the rings and also between the edges of the rings and the helical surfaces of the flanges engaged thereby. It is therefore evident that a spring resistance is first afforded during the movement necessary to put a camber or pitch into the rings, or, in other words, to cause them to assume a helical form, and such resistance may be sufficient to absorb the shocks and stresses due to the ordinary running of a train, so that the expansion and contraction of the rings and the resulting frictional resistance are only brought into action in case of greater stresses or more violent shocks, such as occur in starting, stopping, or switching of cars.

When the mechanism is compressed to its maximum extent, as shown in Figs. 3 and 4, the opposite edges of each outer expansible ring engage the adjacent helical surfaces of two flanges which form stops for limiting the movement.

While I prefer to use a helical surface for engaging the edges of the spring-rings, my invention is not limited thereto, since it will be evident that any other properly-formed surface not a plane may be employed and so arranged as to cause the rings to assume a certain camber or pitch when subjected to a longitudinal compressive stress.

By means of this improvement the cost of manufacture is greatly reduced, since the circular spring-rings with inclined or conical frictional faces are easily and cheaply constructed, while the making of helical spring-rings with inclined engaging frictional faces is a difficult and expensive operation.

Having now described my invention, what I claim as new, and desire to secure by Letters Patent, is—

1. A yielding-resistance mechanism comprising a plurality of resilient elements having coöperating frictional faces, and a pair of relatively movable members, one of said members having a helical surface for engaging one of the resilient elements.

2. A yielding-resistance mechanism comprising a plurality of resilient rings of circular form having coöperating frictional faces and a member movable longitudinally of the line of pressure and having a helical surface for engaging one of said resilient rings.

3. A yielding-resistance mechanism comprising a plurality of independent elements resilient transversely of the line of pressure and having inclined coöperating frictional faces, and a plurality of relatively movable members each having a helical surface for engaging one of said resilient elements.

4. A yielding-resistance mechanism comprising a series of resilient elements having coöperating inclined frictional faces, and relatively movable members, one of said members having other than a plane face for engaging one of the resilient elements.

5. A yielding-resistance mechanism comprising a series of resilient rings having coöperating inclined frictional faces, and a member movable longitudinally of the line of pressure and provided with other than a plane face for engaging one of said resilient rings.

6. A yielding-resistance mechanism comprising a series of resilient circular rings having inclined engaging frictional faces, and a member movable longitudinally of the line of pressure and provided with other than a plane face for engaging the edge of one of said resilient rings.

7. The combination with an expansible spring-ring and a compressible spring-ring having engaging frictional faces, of a member movable longitudinally of the line of pressure and provided with other than a plane face for engaging one of said spring-rings.

8. The combination with a series of split circular spring-rings having coöperating inclined frictional faces, of means for bending said rings to a helical form when subjected to compression.

9. The combination with a series of circular expansible spring-rings having inclined frictional faces, and a series of circular compressible spring-rings having inclined frictional faces engaging the frictional faces of the expansible rings, of means for bending said rings to a helical form when subjected to axial compression.

10. The combination with a series of resilient elements having engaging frictional faces, of a core supporting said elements and provided with flanges having other than plane surfaces for engaging said elements when subjected to compression.

11. The combination with a series of resilient rings having coöperating inclined frictional faces, of a sectional core for supporting said rings, said sections being provided with flanges having helical surfaces for engaging the rings when subjected to compression.

12. The combination with a series of pairs of resilient rings, each pair comprising a compressible and an expansible ring having engaging frictional faces, of relatively movable sections located between said pairs and having helical faces for engaging said rings when subjected to compression.

13. The combination with a series of split circular spring-rings having coöperating inclined frictional faces, of relatively movable members or sections having helical surfaces for engaging the rings when subjected to compression.

14. The combination with a series of split circular spring-rings having coöperating inclined frictional faces, of relatively movable members or sections having helical surfaces for engaging the rings when subjected to compression, and means for preventing the relative rotation of the rings and sections.

In testimony whereof I have hereunto set my hand.

GEO. WESTINGHOUSE.

Witnesses:
R. F. EMERY,
JAS. B. MACDONALD.